G. L. SCHNABLE AND F. F. ABBOTT.
METHOD OF AND APPARATUS FOR TESTING FIBROUS MATERIALS.
APPLICATION FILED JUNE 28, 1919.
1,436,323.
Patented Nov. 21, 1922.
3 SHEETS—SHEET 2.
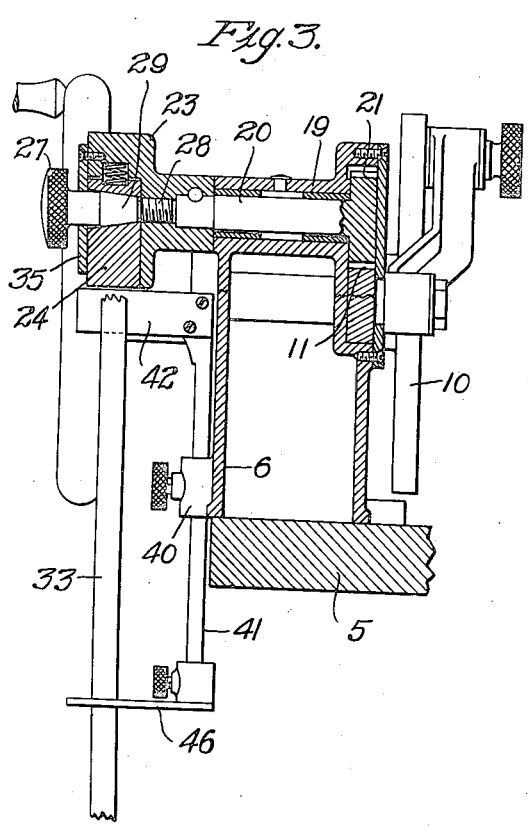
Fig. 3.
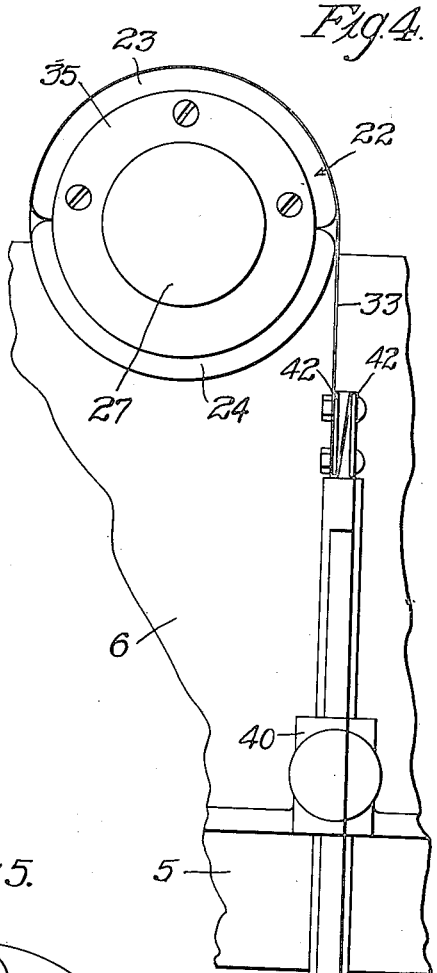
Fig. 4.
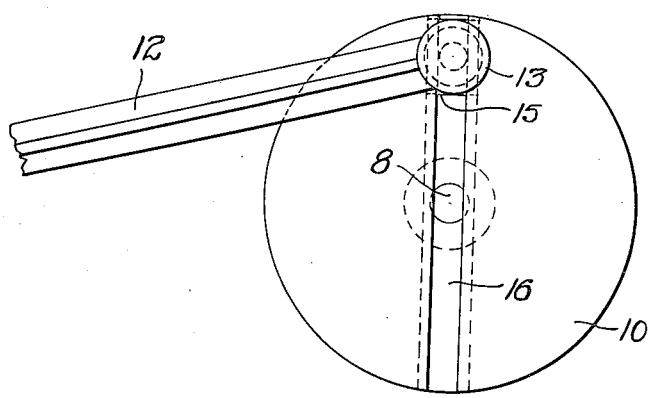
Fig. 5.
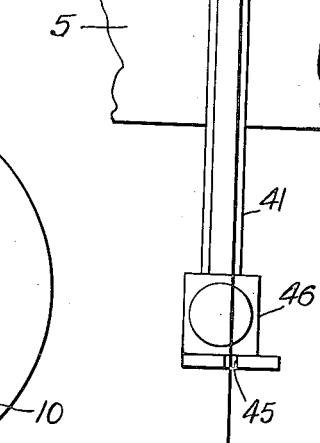
Inventors
George L. Schnable
Frank F. Abbott
by J. E. Roberts
Atty.

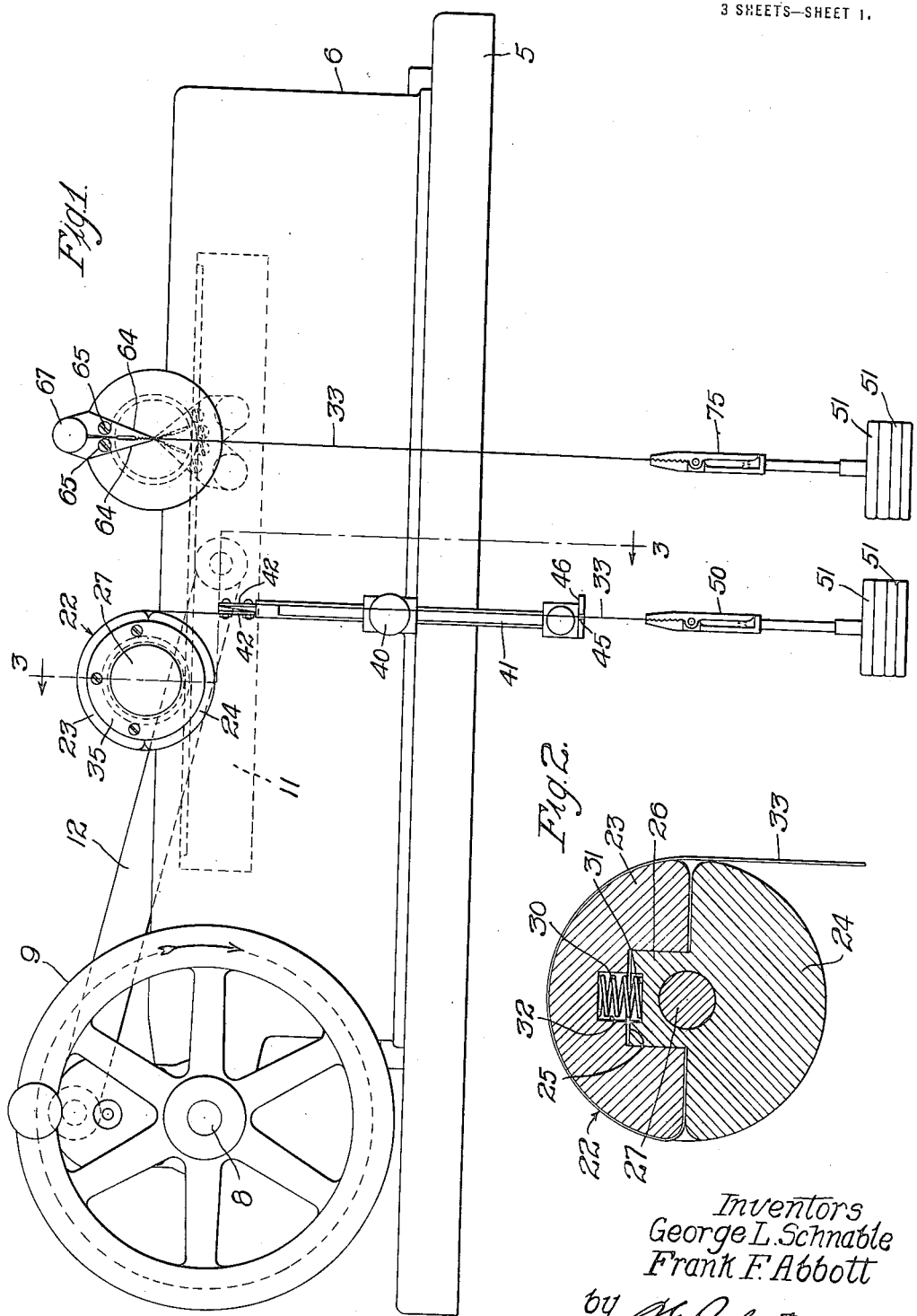

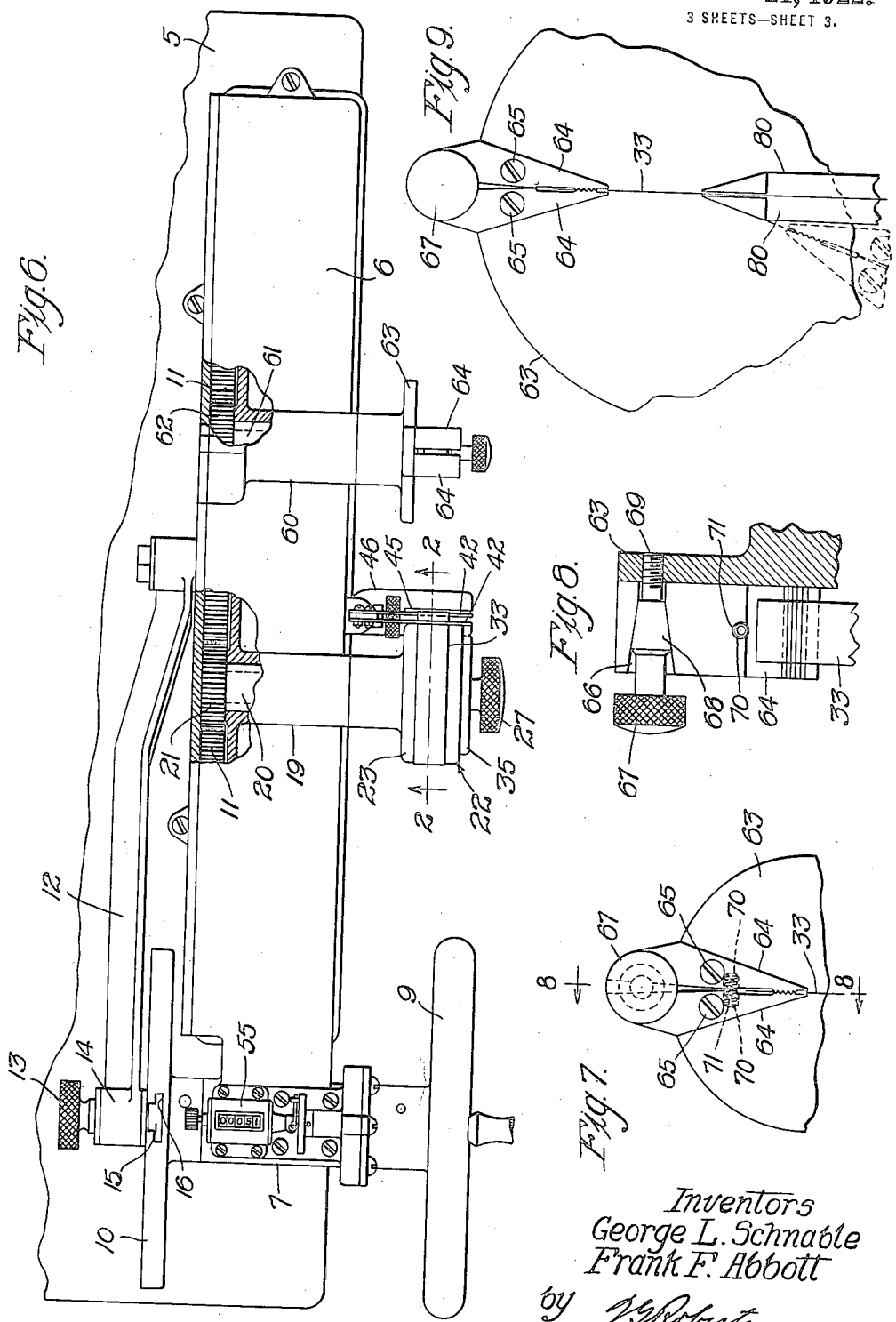

Patented Nov. 21, 1922.

1,436,323

UNITED STATES PATENT OFFICE.

GEORGE L. SCHNABLE AND FRANK F. ABBOTT, OF BERWYN, ILLINOIS, ASSIGNORS TO WESTERN ELECTRIC COMPANY, INCORPORATED, OF NEW YORK, N. Y., A CORPORATION OF NEW YORK.

METHOD OF AND APPARATUS FOR TESTING FIBROUS MATERIALS.

Application filed June 28, 1919. Serial No. 307,283.

*To all whom it may concern:*

Be it known that we, GEORGE L. SCHNABLE and FRANK F. ABBOTT, citizens of the United States, residing at Berwyn, in the county of Cook and State of Illinois, have invented certain new and useful Improvements in a Method of and Apparatus for Testing Fibrous Materials, of which the following is a full, clear, concise, and exact description.

This invention relates to a method of and apparatus for testing fibrous materials which in practice are subjected to friction and folding, and is particularly applicable to paper such as is used in the manufacture of paper insulated cables, and its application will be described in connection with this material although it will be evident that in its broader aspects the invention is applicable to many different materials.

In the process of manufacturing paper insulated cables the cables are subjected to a baking operation for the purpose of driving out all moisture from the insulating material. It has been found that in certain grades or qualities of paper used in the insulation of conductors which go to make up the cable this backing operation devitalizes the paper to such an extent and it becomes so brittle that any bending of the conductor or of the insulation around the conductor which may be necessary in making splices or for other purposes causes the paper to break down or crumble, thereby losing its effect and destroying the cable. A theory, which has been fairly well established by experiments, is that the baking operation causes a chemical reaction due to the residual chemicals in the paper which brings about the devitalizing of the paper and that the devitalization under ordinary conditions of baking is directly proportional to the amount of certain residual chemicals in the paper.

It is one of the objects of this invention to establish a method of testing the paper whereby the probable deterioration of the paper upon baking can be roughly estimated by mechanical means. It has been found that certain mechanical tests upon the paper both before and after baking will give an approximation of the condition to be expected in the paper after it has been thoroughly baked in the cable. One of these tests is a friction folding test applied to the paper before baking, and the results from such tests measured in the number of folds which the paper will withstand before breaking will be an indication of the vitality of the paper after it has been baked. Another test to which the paper may be subjected is a so-called "pure" folding test, in which the paper is not subjected to any rubbing or friction during the test. This pure folding test which if applied to the paper both before and after baking will give an approximation of the amount of baking which the paper will be able to withstand without serious loss of vitality.

Another object of this invention relates to a simple and convenient form of mechanism for making the tests.

Generally speaking, this mechanism may comprise a reciprocating driving member suitably connected with rotatable members for rotating them rapidly back and forth through a quadrant or the arc of a circle. The rotatable members are provided with suitable clamping jaws in which the samples of material to be tested may be secured, and the unsecured ends of the samples are held by tensioning means which may comprise springs or weights. Suitable means are provided for subjecting the material to friction in one of the tests.

In the drawings illustrating this invention

Fig. 1 is a view in side elevation of a machine embodying the features of the invention and capable of being used in the practice of the method;

Fig. 2 is a detail cross-sectional view of a clamping means taken upon line 2—2 of Fig. 6;

Fig. 3 is a transverse cross-sectional view taken on line 3—3 of Fig. 1;

Fig. 4 is a fragmentary detail view on an enlarged scale of parts shown in Fig. 1;

Fig. 5 is a fragmentary detail view of the driving mechanism illustrating the method of adjustment;

Fig. 6 is a plan view of the mechanism illustrated in Fig. 1;

Fig. 7 is a fragmentary detail view of one of the clamping means used in this invention;

Fig. 8 is a transverse sectional view taken on line 8—8 of Fig. 7, and

Fig. 9 is a fragmentary detail view of a modified clamping and folding means which may be used in this invention.

As shown in the drawings, 5 designates a supporting base or table upon which is mounted a hollow housing 6 for supporting the mechanism of this invention. Rotatably mounted within a bearing 7 at one end of the housing 6 is a shaft or spindle 8 upon one end of which is secured a hand wheel 9 and upon the opposite end of which is secured a slotted disk or plate 10. Located within the housing 6 is a reciprocating rack bar 11 which is operated by means of a pitman 12, one end of which is connected with the rack bar, the other end being adjustably connected with the slotted plate 10. A clamping screw 13 which extends through a suitable bearing 14 in the end of the pitman 12 engages a suitable nut or slide 15 in a slot 16 which is provided in the face of the plate 10. By adjusting this end of the pitman 12 transversely of the plate 10 any desired length of movement for the rack bar 11 can be obtained.

Rotatably mounted in a suitable bearing 19 located on top of the housing 6 and about midway of the end thereof is a shaft 20 on one end of which is a pinion 21 meshing with the rack bar 11. Upon the opposite end of the shaft 20 is a paper clamping mechanism 22 which as more clearly shown in Figs. 2 and 3 comprises a fixed part 23 and a movable part 24. The parts 23 and 24 are semi-cylindrical in shape and the part 23 is provided with a cut-away portion 25 into which a projecting portion 26 on the movable part 24 projects. The movable part 24 is provided with a tapered opening therein through which is inserted a thumb screw 27 which is provided on one end with a threaded portion 28 adapted to engage threads in the fixed member 23 and between its ends with a tapered portion 29 adapted to engage the walls of the tapered opening in the movable part 24. A coil actuating spring 30 fitting into registering notches 31 and 32 in the fixed and movable parts 23 and 24 respectively tends normally to separate these parts when the thumb screw 27 is loosened. In the operation of this clamping means the thumb screw 27 will be loosened sufficiently to permit a separating of the parts 23 and 24 through the action of the spring 30, and the end of a paper sample 33 to be tested will be inserted between the abutting surfaces of these two members and the thumb screw 27 tightened which will bring the parts 23 and 24 together with sufficient pressure to clamp the end of the paper 33 therebetween. A plate 35 secured to the fixed member 23 secures the movable member 24 against lateral movement when the thumb screw 27 is loosened.

Adjustably mounted in a lug 40 secured to the lower part of the housing 6 is a vertically slidable supporting rod 41 to the upper end of which is secured a pair of laterally separated plates 42—42, preferably of hardened steel. These plates are located slightly below the clamping member 22 and in such relation thereto that the outer face of the left-hand plate 42 is in the plane of a line tangent to the clamping member 22 at the point of a horizontal line through its axis. The outer face of the right-hand plate 42 is in line with an opening 45 in a guide member 46 adjustably secured to the lower end of the supporting rod 41.

The last described portion of the apparatus is used for a combined fold and friction test on the paper sample and in carrying out this test one end of the paper sample 33 will be passed half way around the clamping mechanism 22 and will have its end secured between two members of this clamping mechanism on the side thereof opposite to the metal plates 42—42. The paper will then be passed from the clamping member 22 down to the lower edge of the left-hand plate 42, over this lower edge and up between the two plates 42, over the top edge of the right-hand plate 42, and from there downwardly through the opening 45 in the guide member 46, and a clamping weight holder 50 will be secured to the lower end thereof. The pitman 12 will be so adjusted that movement of the rack bar 11 will cause but a slight rotation of the clamping member 22, and the hand wheel 9 will be rotated to oscillate the clamping member 22, thereby moving the paper sample 33 up and down between the plates 42—42. This movement of the sample 33 will give to it a folding effect where it passes through the plates 42—42, and weights 51—51 upon the clamping member 50 will cause friction to be applied to the sample in the portion which is being folded by its passage between the plates 42—42.

A counting apparatus such as the Veeder counter 55 may be operated in the rotation of the hand wheel 9 to indicate the number of folds undergone by the sample before separation.

Referring now to the mechanism by means of which the pure fold test is obtained, 60 designates a housing or bearing secured to the top of the housing 6 and in which is located a shaft 61, one end of which carries a pinion 62 in mesh with the rack bar 11, the other end carrying a plate 63 upon which is mounted a pair of pivotal jaws 64—64, more clearly shown in Figs. 7 and 8. As shown, these jaws 64—64 are secured to the plate 63 by means of pivotal screws 65—65. At its upper end each of the jaws 64 is provided with a semi-circular recess or opening 66 which is tapered from its outer end inwardly, and a clamping nut 67 provided between its ends with a tapered shank or portion 68 and on its inner end with a screw threaded portion 69 adapted to engage the plate 63 registers with the recessed portion 66—66 of the two jaws to swing these jaws about their pivots 65—65 when it is operated. Below the pivotal screws 65—65 in the jaws 64—64 are recesses 70—70 within which is located a coil actuating spring 71 adapted when the thumb screw 67 is loosened to spread the jaws 64—64 apart at their lower ends. The lower ends of the jaws 64—64 terminate in a horizontal line along the axis of rotation of the plate 63, and the clamping faces of these jaws 64—64 are in a vertical plane perpendicular to the axis of rotation of the plate 63 so that when a paper sample 33 is clamped therebetween and the plate 63 is rotated, the movement of the inner ends of the jaws 64—64 will be such that the paper sample 33 will be given a pure fold around the axis of rotation of the plate 63 without lateral or vertical movement.

In the operation of this part of the mechanism the paper sample 33 will be secured between the jaws 64—64 and the pitman 12 controlling the rack bar 11 will be so adjusted that any desired degree of rotation or oscillation of the plate 63 may be obtained. In the practice of the invention, however, it is desirable in order that the best results may be obtained that this plate be rotated so that the fold in the paper for each complete cycle of rotation of the plate will be approximately 320°. The lower end of the sample 33 under test can be held by means of weights held by a clamping member 75 which is secured to the lower end of the sample 33.

In the modification of the pure fold test mechanism shown in Fig. 9 the clamping jaws 64—64 are mounted eccentrically to the axis of rotation of the plate 63 and a pair of stationary jaws 80—80 are provided which bear the same relation to the axis of rotation of the plate 63, as did the lower ends of the jaws 64—64 shown in Figs. 7 and 8. In this modified form of mechanism the fold will take place around the ends of the stationary jaws 80—80.

What is claimed is:

1. The method of testing fibrous material, which consists in subjecting it to friction by drawing it over stationary plates and simultaneously to a repeated folding in the portion which is subjected to friction until separation occurs.

2. The method of testing fibrous material, which consists in holding a sample to be tested under tension, folding it repeatedly in the portion under tension, and simultaneously subjecting it to friction by drawing it over stationary plates and rubbing in the portion being folded.

3. In a machine for testing fibrous material, a reciprocally operated clamping means for a test sample, and stationary plates co-operating with said reciprocally operated means for shiftably folding the test sample and simultaneously subjecting it to friction in the folded part.

4. In a machine for testing fibrous material, a reciprocally operated clamping means for securing one end of a test sample, tensioning means applied to the other end of said sample, and means intermediate said clamping means and said tensioning means for causing the sample to be repeatedly folded in the operation of said reciprocating clamping means.

5. In a machine for testing fibrous material, a reciprocally operated clamping means for securing one end of a test sample, tensioning means applied to the other end of said test sample, and a pair of horizontally separated members around which the test sample is passed to cause it to be repeatedly folded in the operation of the reciprocally operated clamping means.

6. In a machine for testing fibrous material, a reciprocally operated clamping means for securing one end of a test sample and reciprocating it, tensioning means applied to the other end of the sample, and a pair of horizontally separated parallel blades over and under which the sample to be tested is passed to cause it to be folded and simultaneously subjected to friction in the operation of the reciprocally operated clamping means.

7. In a machine for testing fibrous material, a rotatable clamping means for securing one end of a test sample, tensioning means for the other end of said test sample, and means for rotating said clamping means to fold the sample about a fixed point through a large angle and in a given line.

8. In a machine for testing fibrous material, a pair of rotatably mounted clamping jaws for gripping one end of a test sample, said jaws being mounted with their inner ends in the line of the axis of rotation of said jaws, tensioning means adapted to be applied to the tested end of said material, and means for rotating said jaws back and forth through an angle of approximately 320 degrees to repeatedly fold the material in a given line.

In witness whereof, we hereunto subscribe our names this 17th day of June, A. D. 1919.

GEORGE L. SCHNABLE.
FRANK F. ABBOTT.